United States Patent
Whear et al.

(10) Patent No.: US 8,967,598 B2
(45) Date of Patent: Mar. 3, 2015

(54) BUSHING

(75) Inventors: Frank Roland Whear, Warwickshire (GB); David Boon, Southam (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 1072 days.

(21) Appl. No.: 12/738,817

(22) PCT Filed: Oct. 10, 2008

(86) PCT No.: PCT/IB2008/002727
§ 371 (c)(1),
(2), (4) Date: Aug. 31, 2011

(87) PCT Pub. No.: WO2009/050560
PCT Pub. Date: Apr. 23, 2009

(65) Prior Publication Data
US 2011/0302739 A1 Dec. 15, 2011

(30) Foreign Application Priority Data
Oct. 19, 2007 (GB) .................................. 0720476.1

(51) Int. Cl.
F16F 13/14 (2006.01)
F16F 3/087 (2006.01)
(52) U.S. Cl.
CPC .............. *F16F 3/0873* (2013.01); *F16F 13/14* (2013.01)
USPC .................. 267/140.12; 267/141.1; 267/141.2

(58) Field of Classification Search
CPC .................................................... F16F 13/1418
USPC .......... 267/140.11, 140.12, 141, 141.1, 141.2
See application file for complete search history.

(56) References Cited

U.S. PATENT DOCUMENTS

| 4,728,086 | A | * | 3/1988 | Ishiyama et al. ......... 267/140.12 |
| 5,044,813 | A | * | 9/1991 | Gregg ..................... 267/140.12 |
| 5,172,894 | A | * | 12/1992 | Hein et al. ............... 267/140.12 |
| 6,199,840 | B1 | * | 3/2001 | Yano ....................... 267/140.12 |
| 6,435,486 | B2 | * | 8/2002 | Maier ...................... 267/140.12 |
| 6,688,588 | B2 | * | 2/2004 | Vossel et al. ............. 267/140.12 |
| 7,540,478 | B2 | * | 6/2009 | de Fontenay et al. .... 267/140.12 |
| 2006/0081427 | A1 | * | 4/2006 | Gautier et al. ................ 188/267 |

FOREIGN PATENT DOCUMENTS

| FR | 2701299 A1 | 8/1994 |
| GB | 2211271 A | 6/1989 |
| JP | 61109934 A | 5/1986 |

OTHER PUBLICATIONS

International Search Report for patent application No. PCT/IB2008/002727, mailed Mar. 31, 2009, 2 pages.

* cited by examiner

*Primary Examiner* — Thomas J Williams
(74) *Attorney, Agent, or Firm* — Shumaker & Sieffert, P.A.

(57) ABSTRACT

A bushing suitable for use as a vehicle suspension mount comprises a hydraulic component in series with an outer rubber bushing. The series combination provides good absorption of shock loads without exceeding suspension system packaging constraints.

19 Claims, 2 Drawing Sheets

BUSHING

CROSS-REFERENCE TO RELATED APPLICATIONS

This application claims foreign priority benefits under 35 U.S.C. §119(a)-(d) to GB 0720476.1 filed Oct. 19, 2007, which is hereby incorporated by reference in its entirety.

BACKGROUND OF THE INVENTION

1. Field of the Invention

The present invention relates to bushings and particularly, though not exclusively, to bushings for use in motor vehicle suspension systems.

2. Background Art

Typically, a bushing is located between a suspension component e.g. one end of a wishbone and the vehicle chassis or body. The bushing incorporates a resilient component for the purposes of cushioning shocks, reducing vibrations transmitted from the vehicle's wheels to the vehicle body and passengers and allowing movement of the vehicle relative to the vehicle body.

One known type of bushing consists of inner and outer metal cylindrical sleeves separated by a piece of rubber. It can be designed to have a linear or non-linear deflection versus force characteristic. Another known type of bushing is the hydraulic bushing, typically including a rubber portion having a plurality of interconnected cavities which contain hydraulic fluid. A hydraulic bushing typically has a non-linear, progressive stiffness whereby the amount it deflects tends towards a constant value with increasingly high loads.

The current automotive trend for large wheels and low profile tires results in increasing suspension loads needing to be withstood by the suspension structure and bushings. One known solution to this problem is to make the bushing bigger, thereby increasing its load capability. However, large rubber bushes have a tendency to induce steering wheel shimmy and large hydraulic bushes tend to degrade impact performance, making the suspension feel harsh. A large bushing also introduces packaging problems in the design of the suspension.

US-A-2003/0137087 describes a series bushing comprising a first inner spring portion incorporating hydraulic fluid cavities and a second outer spring portion formed of microcellular polyurethane. The presence of the polyurethane material permits good isolation of low amplitude, high frequency vibrations but would be too weak to withstand high impact loads, such as a vehicle tire striking the edge of a pothole, for example.

SUMMARY OF THE INVENTION

According to the present invention there is provided a bushing comprising an inner resilient component connected in series with an outer resilient component whereby both components suffer a characteristic amount of deflection under any given applied force, and wherein the inner resilient component has a non-linear stiffness characteristic whereby its amount of deflection tends towards a constant value for increasingly high applied forces and wherein the outer resilient component has a substantially linear stiffness characteristic and whereby its amount of deflection under any given applied force is less than that of the inner resilient component at the same applied force.

The bushing may be advantageously utilized as a suspension mount in a motor vehicle, for example, between a suspension component and the vehicle's chassis or body. The arrangement of these two resilient components in series permits high shock loads to be reduced through the outer linear component preventing the increase in stiffness which is inherent in the inner component.

At low loads, the inner component makes the greater contribution to absorbing the shock, thus controlling the stiffness of the bushing, whereas at high loads, the outer component dominates the compliance of the bushing.

The inner and outer components may comprise any known suitable type of bushing material or device with the specified stiffness characteristic. For example, the inner may consist of a hydraulic bushing and the outer may comprise a piece of solid elastomeric material, natural or synthetic rubber. Alternatively, the inner may be composed mostly of rubber or polymer designed in such a way to achieve a progressive stiffness characteristic.

BRIEF DESCRIPTION OF THE DRAWINGS

An embodiment of the invention will now be described by way of example only with reference to the drawings of which.

DETAILED DESCRIPTION OF THE PREFERRED EMBODIMENT(S)

Figure 1:
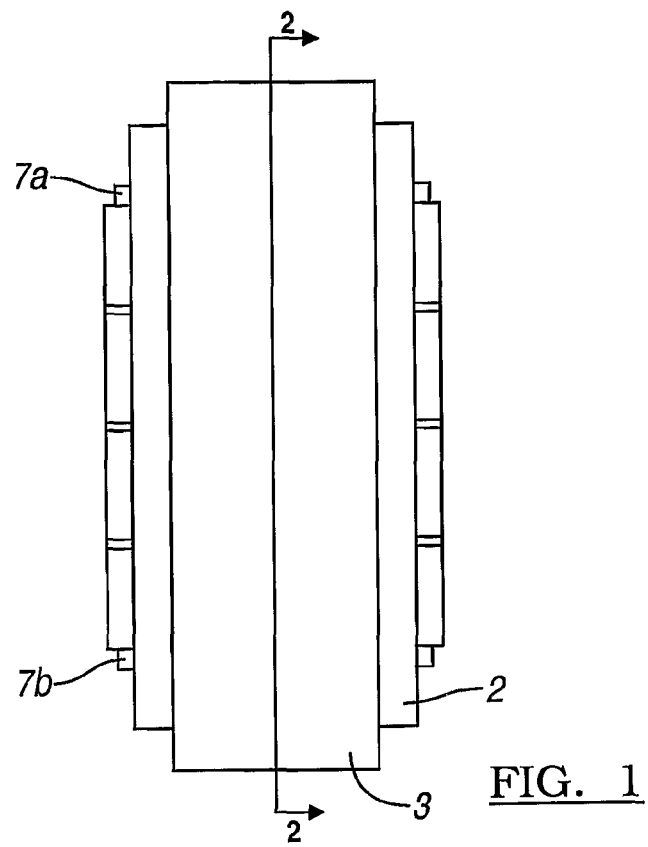
FIG. 1 is a side view of a bushing according to the preferred embodiment.
Figure 2:
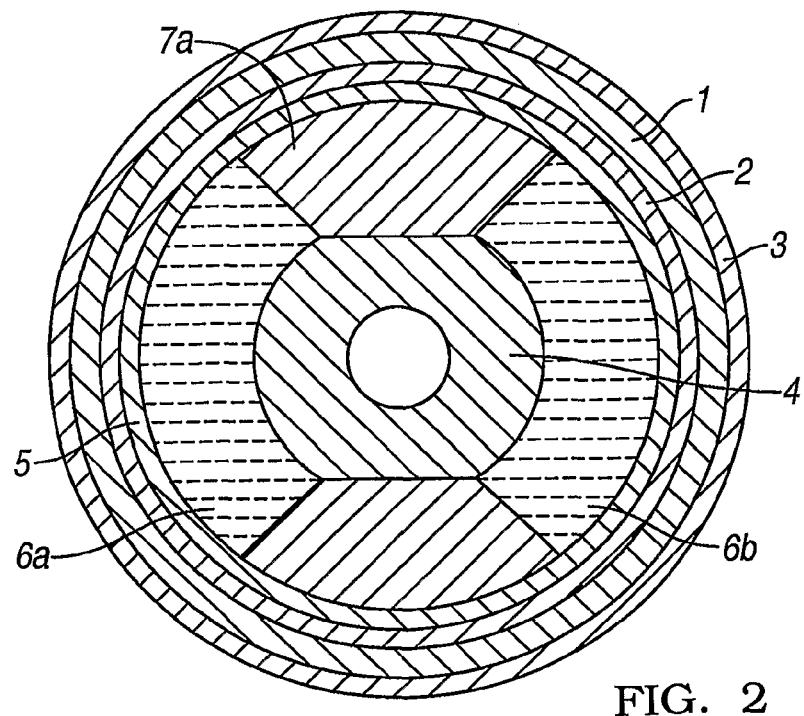
FIG. 2 is a cross-sectional view along a line I-I' of FIG. 1.

The bushing of FIGS. 1 and 2 comprises an inner hydraulic bushing in series with an outer rubber bushing.

The outer rubber bushing comprises a cylindrical piece of rubber 1 supported around its inner and outer perimeters by metal cylinders 2 and 3 respectively. This outer rubber bushing has a stiffness characteristic as illustrated by curve A in FIG. 3 i.e. its deflection increases in a substantially linear fashion with increasing applied force.

The inner hydraulic bushing is supported by a central metal portion 4 and the inner metal cylinder 2. This hydraulic bushing comprises an annular outer piece of rubber 5 which encloses two hydraulic fluid-filled chambers 6a, 6b, separated by two rubber portions 7a, 7b. This inner hydraulic bushing has a stiffness characteristic as illustrated by curve B in FIG. 3 i.e. it has a progressive stiffness whereby for comparatively low applied forces its deflection increases in a substantial fashion whereas for increasingly high applied forces, its deflection tends towards a constant value. For any given applied force, the amount of deflection is less for the outer bushing than it is for the inner bushing.

Figure 3:
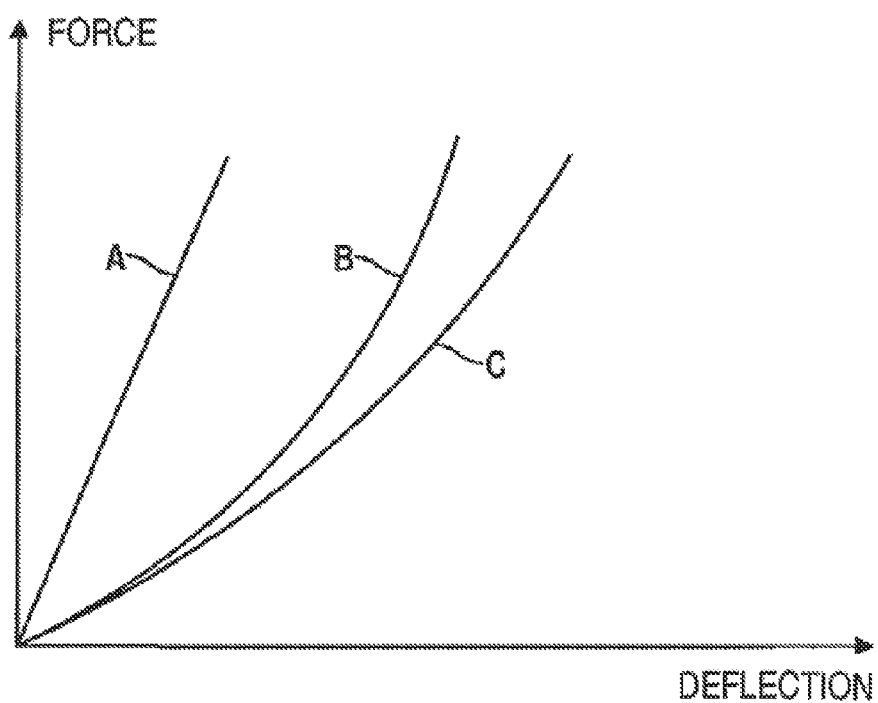
FIG. 3 is a graph of applied force against deflection.

The two bushings are arranged in series operation and their combined effect is illustrated by curve C of FIG. 3. The combination results in a bushing which has a superior energy absorption quality compared with a single hydraulic or rubber bushing.

The example described has the further advantage of compactness, therefore relaxing packaging requirements on vehicle suspension design.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A bushing comprising:
an elastomeric portion comprising an outer elastomeric material with an outer perimeter of the outer elastomeric material supported by an outer cylinder and an inner perimeter of the outer elastomeric material supported by an inner cylinder, wherein the outer elastomeric material fills a space between the inner cylinder and the outer cylinder;
a hydraulic portion comprising an inner elastomeric material with an outer perimeter of the inner elastomeric material supported by the inner cylinder and an inner perimeter of the inner elastomeric material supported by a central portion of the bushing, wherein the inner elastomeric material forms a fluid chamber; and
a hydraulic fluid disposed in the fluid chamber,
wherein the hydraulic portion is disposed inside the elastomeric portion and connected in series thereto,
wherein the hydraulic portion further includes an annular outer element enclosing the fluid chamber, the annular outer element being adjacent to the inner cylinder.

2. The bushing of claim 1,
wherein the fluid chamber is a first fluid chamber, and
wherein hydraulic portion further includes a second fluid chamber between the central portion and the inner cylinder.

3. The bushing of claim 2,
wherein the annular outer element encloses the first fluid chamber and the second fluid chamber.

4. The bushing of claim 3, wherein the inner elastomeric material includes two portions extending between the annular outer element and the central portion, wherein the two portions separate the two fluid chambers enclosed within the annular outer element.

5. The bushing of claim 1, wherein the space between the inner cylinder and the outer cylinder is an annular space, wherein the outer elastomeric material fills the annular space between the inner cylinder and the outer cylinder.

6. The bushing of claim 1, wherein an amount of deflection under any given applied force for the outer elastomeric material is less than that of the hydraulic portion at the same applied force.

7. The bushing of claim 6,
wherein the hydraulic portion has a non-linear stiffness characteristic whereby its amount of deflection tends towards a constant value for increasingly high applied forces, and
wherein the outer elastomeric material has a linear stiffness characteristic.

8. The bushing of claim 1, wherein an amount of deflection under any given applied force, in any radial direction, for the outer elastomeric material is less than that of the hydraulic portion at the same applied force.

9. The bushing of claim 1, wherein the inner elastomeric material is composed of rubber.

10. The bushing of claim 1, wherein the outer elastomeric material is composed of rubber.

11. The bushing of claim 1, wherein the space is defined by separation between the inner cylinder and the outer cylinder.

12. An assembly comprising
a vehicle chassis of a vehicle;
a suspension component of the vehicle; and
a bushing located between the vehicle chassis and the suspension component, wherein the bushing includes:
an elastomeric portion comprising an outer elastomeric material with an outer perimeter of the outer elastomeric material supported by an outer cylinder and an inner perimeter of the outer elastomeric material supported by an inner cylinder, wherein the outer elastomeric material fills a space between the inner cylinder and the outer cylinder;
a hydraulic portion comprising an inner elastomeric material with an outer perimeter of the inner elastomeric material supported by the inner cylinder and an inner perimeter of the inner elastomeric material supported by a central portion of the bushing, wherein the inner elastomeric material forms a fluid chamber; and
a hydraulic fluid disposed in the fluid chamber,
wherein the hydraulic portion is disposed inside the elastomeric portion and connected in series thereto,
wherein the hydraulic portion further includes an annular outer element enclosing the fluid chamber, the annular outer element being adjacent to the inner cylinder.

13. The assembly of claim 12,
wherein the fluid chamber is a first fluid chamber, and
wherein hydraulic portion further includes a second fluid chamber between the central portion and the inner cylinder.

14. The bushing of claim 13,
wherein the annular outer element encloses the first fluid chamber and the second fluid chamber.

15. The bushing of claim 14, wherein the inner elastomeric material includes two portions extending between the annular outer element and the central portion, wherein the two portions separate the two fluid chambers enclosed within the annular outer element.

16. The assembly of claim 12, wherein the space between the inner cylinder and the outer cylinder is an annular space, wherein the outer elastomeric material fills the annular space between the inner cylinder and the outer cylinder.

17. The assembly of claim 12, wherein an amount of deflection under any given applied force for the outer elastomeric material is less than that of the hydraulic portion at the same applied force.

18. The assembly of claim 17,
wherein the hydraulic portion has a non-linear stiffness characteristic whereby its amount of deflection tends towards a constant value for increasingly high applied forces, and
wherein the outer elastomeric material has a linear stiffness characteristic.

19. The assembly of claim 12, wherein an amount of deflection under any given applied force, in any radial direction, for the outer elastomeric material is less than that of the hydraulic portion at the same applied force.

* * * * *